United States Patent
Schumann et al.

(10) Patent No.: US 10,036,646 B2
(45) Date of Patent: Jul. 31, 2018

(54) TRANSMITTING ROUTE DATA TO A MOTOR VEHICLE

(71) Applicant: AUDI AG, Ingolstadt (DE)

(72) Inventors: Toralf Schumann, Neuhaus (DE); Guido Mueller, Hohenbrunn (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/542,001

(22) PCT Filed: Jan. 12, 2016

(86) PCT No.: PCT/EP2016/000041
§ 371 (c)(1),
(2) Date: Jul. 6, 2017

(87) PCT Pub. No.: WO2016/113130
PCT Pub. Date: Jul. 21, 2016

(65) Prior Publication Data
US 2017/0370742 A1    Dec. 28, 2017

(30) Foreign Application Priority Data
Jan. 13, 2015    (DE) ........................ 10 2015 000 403

(51) Int. Cl.
*G01C 21/34* (2006.01)
*G01C 21/36* (2006.01)
*H04W 4/04* (2009.01)

(52) U.S. Cl.
CPC ..... *G01C 21/3492* (2013.01); *G01C 21/3691* (2013.01); *H04W 4/046* (2013.01)

(58) Field of Classification Search
None
See application file for complete search history.

(56) References Cited

U.S. PATENT DOCUMENTS

| | | | |
|---|---|---|---|
| 7,593,963 B2 | 9/2009 | Ballesty et al. | |
| 8,645,060 B2 * | 2/2014 | Venkatraman | G01C 21/20 701/411 |

(Continued)

FOREIGN PATENT DOCUMENTS

| | | |
|---|---|---|
| CN | 1383280 A | 12/2002 |
| CN | 1449488 A | 10/2003 |

(Continued)

OTHER PUBLICATIONS

English-language abstract of German Patent Application Publication No. 10 2008 018 163 A1, published Oct. 23, 2008; 1 page.

(Continued)

*Primary Examiner* — Abdhesh K Jha
(74) *Attorney, Agent, or Firm* — Sterne, Kessler, Goldstein & Fox P.L.L.C.

(57) ABSTRACT

The invention relates to a method for transmitting route data to a motor vehicle, wherein the route data describe an area lying ahead. A control device of the motor vehicle carries out the following steps: a) Determining a route section extending between a current position of the motor vehicle and the area; b) Determining a transmission bandwidth, which is expected to be available along the route section; and c) Determining a speed profile of the travel speed which is expected to be achieved along the route section. This results in a start time at which transmission has to be started so that the route data will have been completely transmitted when the area is reached. A trigger location is determined, which corresponds to the start time (23) according to the speed profile.

13 Claims, 9 Drawing Sheets

(56) References Cited

U.S. PATENT DOCUMENTS

| | | |
|---|---|---|
| 8,666,591 B2 | 3/2014 | Stählin et al. |
| 2002/0163925 A1 | 11/2002 | Nakagawa et al. |
| 2003/0158650 A1 | 8/2003 | Abe et al. |
| 2003/0158652 A1* | 8/2003 | Friedrichs .......... G01C 21/3415 701/421 |
| 2004/0117108 A1* | 6/2004 | Nemeth ............. G01C 21/3415 701/421 |
| 2008/0132249 A1 | 6/2008 | Hamilton |
| 2008/0287141 A1 | 11/2008 | Vogel et al. |
| 2011/0301841 A1 | 12/2011 | Schuurbiers et al. |
| 2012/0029806 A1* | 2/2012 | Scalf .................... G01C 21/34 701/421 |
| 2013/0041580 A1* | 2/2013 | Petrucci ............. G06Q 30/0265 701/421 |
| 2013/0321424 A1 | 12/2013 | Pylappan et al. |
| 2014/0185457 A1 | 7/2014 | Barnes et al. |
| 2014/0254543 A1 | 9/2014 | Engelhard et al. |

FOREIGN PATENT DOCUMENTS

| | | |
|---|---|---|
| CN | 101316749 A | 12/2008 |
| DE | 102004055275 A1 | 5/2006 |
| DE | 102008018163 A1 | 10/2008 |
| DE | 102009008959 A1 | 9/2009 |
| DE | 102011118706 A1 | 5/2013 |
| EP | 2120014 A1 | 11/2009 |
| EP | 2543963 A1 | 1/2013 |
| JP | 2004-282456 A | 10/2004 |
| JP | 2010-048797 A | 3/2010 |

OTHER PUBLICATIONS

English-language abstract of Japanese Patent Application Publication No. 2010-048797 A, published Mar. 4, 2010; 2 pages.

English-language abstract of Japanese Patent Application Publication No. 2004-282456 A, published Oct. 7, 2004; 2 pages.

International Search Report and Written Opinion of the International Searching Authority directed to related International Patent Application No. PCT/EP2016/000041, dated Jul. 8, 2016, with attached English-language translation; 38 pages.

International Preliminary Report on Patentability directed to related International Patent Application No. PCT/EP2016/000041, dated Mar. 9, 2017, with attached English-language translation; 17 pages.

\* cited by examiner

TRANSMITTING ROUTE DATA TO A MOTOR VEHICLE

TECHNICAL FIELD

The invention relates to a method for transmitting route data to a mobile terminal device, in particular a motor vehicle. The route data describes an area, which, from the perspective of the terminal device, lies along a current travel route. The present invention also includes a motor vehicle by means of which the inventive method can be implemented.

BACKGROUND

In an onboard navigation system, all data required for the navigation function for the navigation device are preinstalled on an internal or removable storage medium in the motor vehicle. In contrast to this, an online or hybrid navigation system only receives the needed data on demand from a stationary server and stores this data in between locally in the motor vehicle. In doing so, the navigation data regarding the current position and for a corridor along the most probable route, the so-called vehicle horizon, are transmitted from the server to the navigation device. With so-called active route guidance, the data for the corridor along the planned travel route and the vicinity of the driving destination are also downloaded in order to identify alternative routes.

The buffer or cache necessary for buffering the transmitted navigation data is physically limited in any navigation system such that only the absolutely essential navigation data are loaded and cached. Further, optional data, e.g. from a wider corridor along the travel route, are only additionally downloaded, for example, to optimize the navigation functions if there is still free space available in the buffer memory.

The content of a cache or buffer must therefore be administered in such a way that old, unneeded navigation data, the so-called old corridor, be discarded by an algorithm to free up space for new navigation data.

The fundamental problem with an online and hybrid navigation system here is that the navigation data rely on downloading from the server. A mobile connection or another communication link with the corresponding quality is required. However, sufficient necessary quality, i.e. in particular a sufficient transfer rate or transmission bandwidth, is not always provided. It may even be that no online connection is possible if the motor vehicle is in a so-called dead spot. Also, unwanted costs may occur during transfer if it must be, for example, in a so-called roaming zone.

Overall, it is possible that required navigation data requested by a navigation system cannot be downloaded fast enough or not at all due to lack of online availability.

In these cases, there may be functional limitations or even loss of function in the navigation device.

One strategy for overcoming this problem can be to download the navigation data from the server as early as possible to secure its availability. However, this has undesirable high memory requirements for the buffer or cache as a result, which makes the production of such a navigation system in a motor vehicle undesirably expensive. In addition, the navigation data are not current.

A method for predictive downloading of map data to a motor vehicle is known from EP 2120014 A1. Depending on a current driving direction, a future or expected travel route of the motor vehicle is determined and the respective required map material is downloaded along the planned route for individual, rectangular areas. The digital road map is expanded block-by-block in the motor vehicle using this method.

DE 10 2008 018 163 A1 describes a driver assistance system with buffer memory. A driver assistance system is provided in which a navigation unit of a motor vehicle selects a map area from a digital map and transmits it to a driver assistance system. The driver assistance system then calculates the so-called ADAS horizon (ADAS=Advanced Driver Assistance System). From the navigation unit, a map section will be transferred at the time of initialization, which suffices for driving at a defined time T, even if communication fails to the navigation device.

DE 10 2009 008 959 A1 describes a navigation device, in which a digital map can be updated by a dynamic module, for example by integrating traffic jam data or updates on new street guides into the digital map stored in the motor vehicle.

BRIEF DESCRIPTION OF THE DRAWINGS/FIGURES

DETAILED DESCRIPTION

Figure 1:
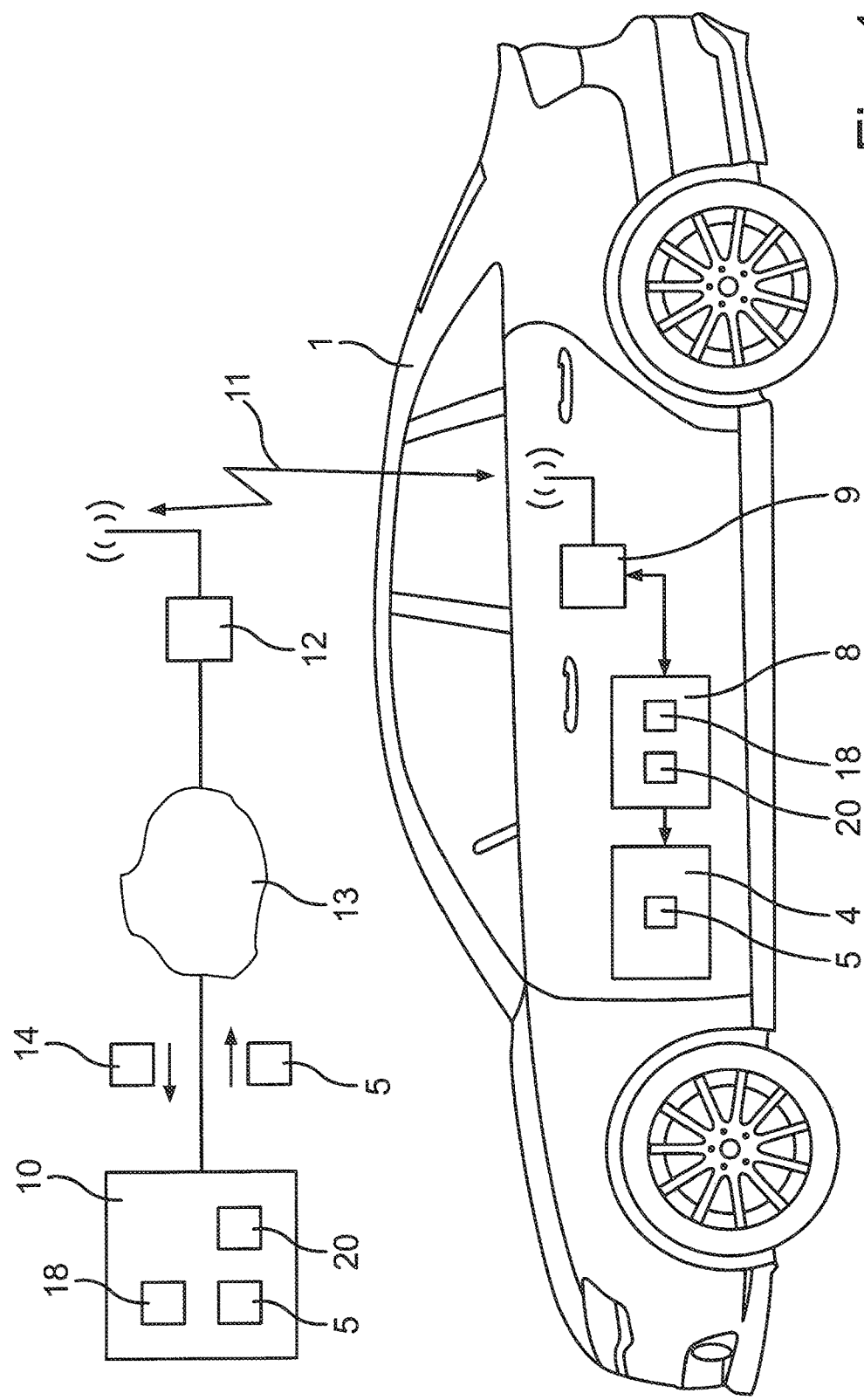
FIG. 1 shows a schematic representation of an embodiment of a motor vehicle according to the invention.

The object of the invention is to provide current route data to a mobile terminal device, in particular in a motor vehicle.

The object is achieved by the subject matters of the independent claims. Advantageous further embodiments of the invention arise from the features of the dependent claims.

The invention provides a method for transmitting route data to a mobile terminal device, in particular a motor vehicle. In addition to a motor vehicle with a communication device, a mobile terminal device can also be, for example, a smartphone or a tablet, or a smart watch. In general, the term "mobile terminal device" can be applied to all portable systems as long as they predict or estimate the travel route or they rely on route data or distance data or they lead to the improved function thereof. The route data describe a forward-lying area along a current travel route of the terminal device, that is particularly a driving route of a motor vehicle. The route data may be the described navigation data, i.e. descriptive data for a road network. Additionally or alternatively, the route data can also contain, for example, weather data for the area through which the weather prevalent in the area is described. Route data are also generally understood to be specific to the area and the data are location-based, wherein the focus is especially on navigation and assisted driving. Data other than route data may also be provided, especially for smart phones and their applications, which require current, location-based data.

The method provides for the identification of a road section, which is between a current position of the terminal device and the area, thus extending between the current position and the area. Along the route section, a transmission bandwidth is determined, which is expected to be available for the transmission of the route data over a communication link. The transmission bandwidth can be provided as a location function and/or time function. The communication link here is, in particular, a wireless connection. But there are also other transmission methods or wireless data connections possible, for example on the basis of light that can be used between a fixed and mobile terminal device and are subjected to location and/or time limitations.

Furthermore, a speed profile of a moving speed of the terminal device expected to be achieved along the route is determined. In other words, the moving speed at which the terminal device is expected to move along the route is determined. It may be based, for example, on an average speed for individual sub-areas, for example using a length of 100 m or 1 km.

Reports of traffic jams, for example, can be considered during the determination of the speed profile.

A start time is then determined, at which the transmission of the route data to the terminal device has to be initiated so that the route data are completely transmitted when the area is reached, in particular exactly when the area is reached, if the terminal device moves along the route section according to the speed profile and the route data are transmitted according to the determined transmission bandwidth. Thus, a trigger location is determined, which corresponds to the start time according to the speed profile on the route section. The route data are not requested from a stationary server via the communication link until the trigger location is reached.

The invention results in the advantage that the route data are transmitted as early as necessary and as late as possible. Thus, it is possible to provide the route data to the terminal device to be as current as possible. In doing so, the route data are maintained area-by-area and at the right time, especially right on time.

The aforementioned stationary server device may be, for example, a computer or an arrangement of multiple computers, which may be connected to the Internet and can communicate with the terminal device via the Internet and, for example, a WLAN router (WLAN Wireless Local Area Network) or a mobile network, such as UMTS (Universal Mobile Telecommunication System) or LTE (Long Term Evolution).

The current route may be determined, for example, by a navigation device, in which a planned travel route has been identified or is stored. The travel route can also be determined, for example, on the basis of an observed movement behavior of a user of the terminal device if, for example, the user travels to work every morning along the same route. A determination can then be made at the beginning of a movement using the time and the movement behavior of the user as to whether the terminal device is again on the travel route typical for this time.

The invention has further embodiments, which result in additional advantages.

In a further embodiment, a digital map is received from the server via the communication link to determine the transmission bandwidth. The digital map provides location-dependent measured values to at least one communication route parameter of the communication route, which affects the transmission bandwidth. For example, the communication route parameter can directly represent the measured transmission bandwidth. A communication system parameter can also indicate transmission technology, i.e. whether, for example, UMTS, LTE, or GSM (Global System for Mobile Communications) is available.

Other sources can also be used, including, for example, data from mobile operators from their mobile fleet. In addition or as an alternative to the measured values, provider-specific control values of the at least one communication route parameter can also be used as a basis. Current settings of at least one communication route parameter, through which the transmission bandwidth of the communication link is determined, are described through the control values. For example, for a wireless cell, an allocated maximum transmission bandwidth can be reported for each terminal device by the mobile network to the server as a control value.

Providing a digital map results in the advantage that for a large area, in particular an area between the current travel route and the area lying ahead, a description of the available transmission bandwidth can be provided with low memory requirements. In addition, the digital map can be updated periodically by the server, so that current measured values relating to the transmission bandwidth in the terminal device are available with the transmission of the digital map.

In a further development, the transmission bandwidth and/or the speed profile is determined based on the measurement data from other vehicles or terminal devices. These are vehicles or terminal devices that are moving in front of the terminal device along the route section. This results in the advantage that a respective measuring device from other vehicles can be used to determine the transmission bandwidth and/or the speed profile. The measurement data can be summarized, for example, to form the described digital map.

In a further embodiment, a variance of the expected moving speed is indicated by the speed profile at at least one location along the route section. Depending on the variance, a time buffer is provided when the start time is determined, by means of which the start time is shifted forward in time. This advantageously provides a safety buffer in the event of uncertainties relating to the moving speed to be expected along the route section.

In a further embodiment, a transmission pause is scheduled if the estimated transmission bandwidth leaves a predetermined quality criterion and/or a predetermined cost criterion in a part of the route section when the start time is determined. A dead spot can also be advantageously considered in that it is specified, for example, that the transmission bandwidth is 0. Also, a very noisy communication route or a communication route with a reception strength less than a minimum value can be considered. For example, a minimum value can be specified as a quality criterion for a signal-to-noise ratio. For example, a maximum cost value for the transmission, for example per amount of data or time unit, can be determined in connection with the cost criterion. In this manner, for example, an area in which a roaming fee must be paid can be excluded.

In a further embodiment, the route data are received as a data package with a version value or version information. After the transfer is complete, a new data package with the route data is then requested, wherein the data package is then requested with a subsequent version value or subsequent version information. This is then carried out if the terminal device is still outside the area. In this manner, the transfer process can advantageously be used to obtain more updated route data before the terminal device reaches the area. An unexpectedly fast transfer rate can result, for example, if the communication link allows for a faster transmission rate or data rate than is predicted in accordance with the expected available transmission bandwidth.

In a further embodiment, the route data include incremental updates. Said route data are combined incrementally by means of the control device. This has the advantage that the data volume of the route data for providing a complete description of the area is less than if the complete route data always had to be transmitted.

In a further embodiment, the route data are requested in sequence by the control device and/or transmitted by the server, which is determined by means of a predetermined prioritization criterion. In this manner, a transmission bandwidth of the communication link that is too low can be compensated for in an advantageous manner once the terminal device reaches the area, without the route data having to have been completely transmitted. Then, at least the data classified as being important in accordance with the priority criterion are more likely to be completely provided in the terminal device.

The present invention also relates to a motor vehicle. The motor vehicle according to the invention has a communication device for communicating with a stationary server while the motor vehicle is traveling. The communication device may have, for example, a WLAN wireless module and/or a mobile wireless module. Furthermore, a device for providing a vehicle function is provided. The vehicle function is provided on the basis of route data, which describe a forward-lying area of a current driving route of the trip. The device may be, for example, a navigation device, which uses navigation data for providing navigation assistance as route data. The device may also be, for example, an infotainment system (information and entertainment system) that, for example, provides current weather data and other current information about the area for vehicle occupants. The device may also be, for example, a driver assistance device, such as a control unit of an ESP (Electronic Stability Program). The method can be applied in different systems (in the motor vehicle). An ESP control unit is only an example here.

A control device is provided to the motor vehicle according to the invention, which is designed to transmit the route data from the server using the communication device, to carry out an embodiment of the method according to the invention, and to provide the route data in the device transmitted hereby. The control device may be, for example, a control unit of the motor vehicle or a central computing device of the motor vehicle.

The motor vehicle according to the invention is preferably designed as a car, in particular as a passenger car.

Figure 2:
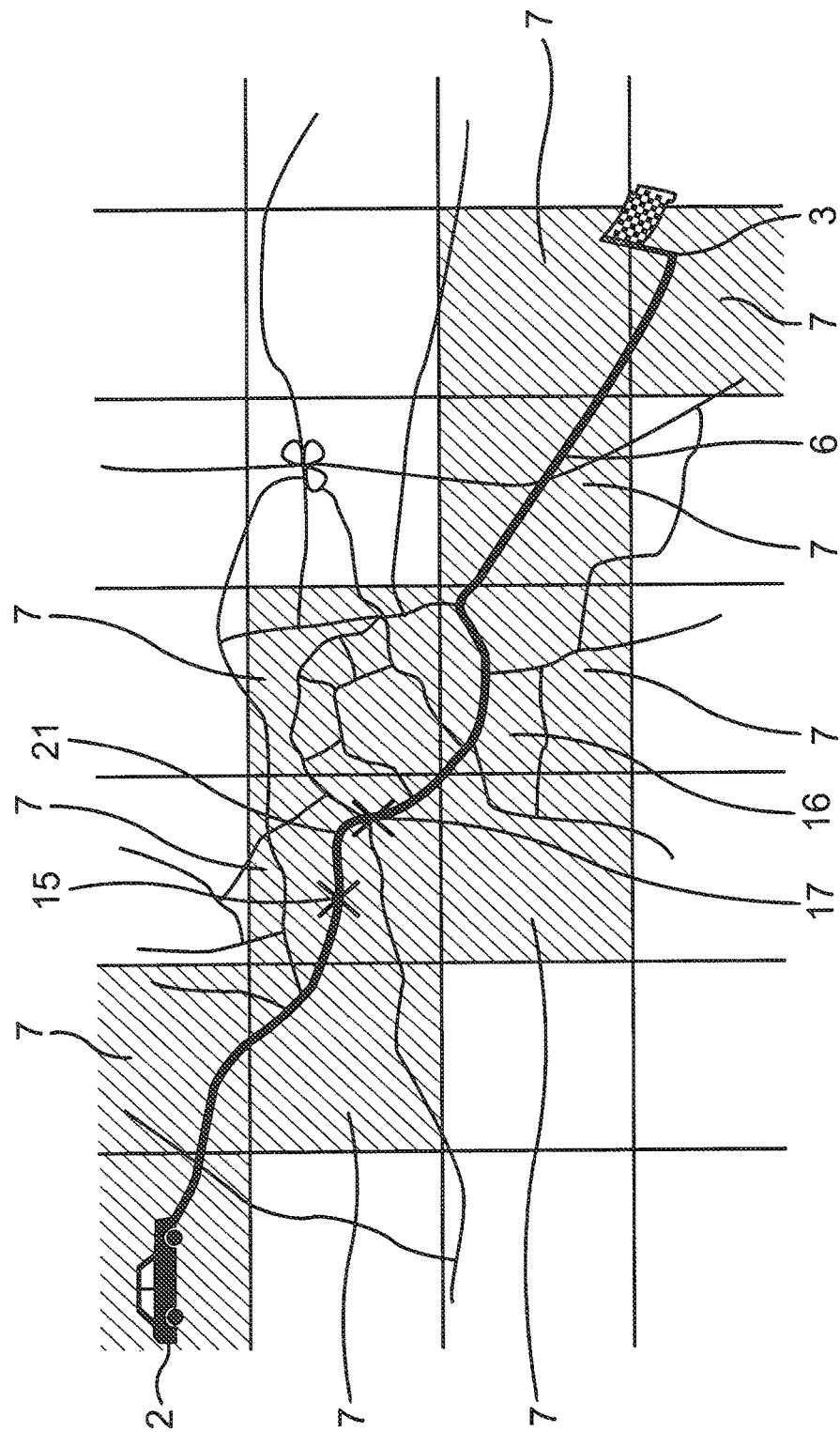
FIG. 2 shows a sketch for a trip of the motor vehicle from FIG. 1 along a driving route.
Figure 3:
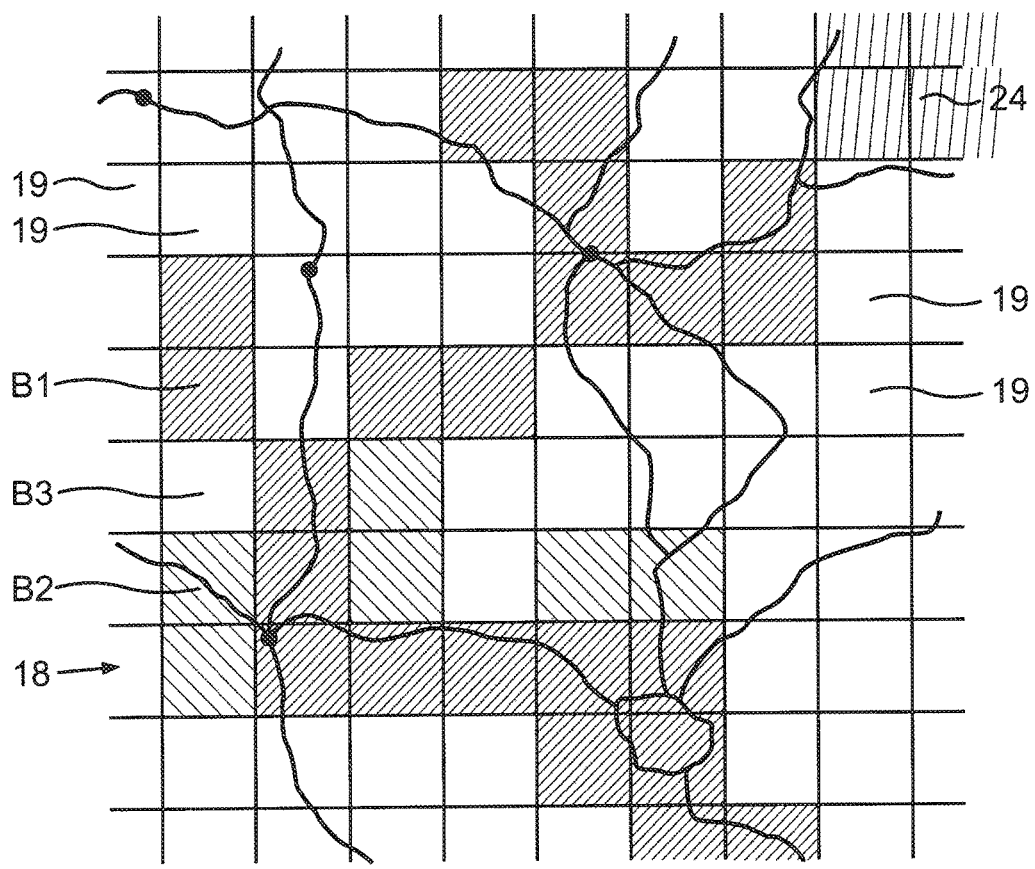
FIG. 3 shows a digital map with measured values of an expected transmission bandwidth.
Figure 4:
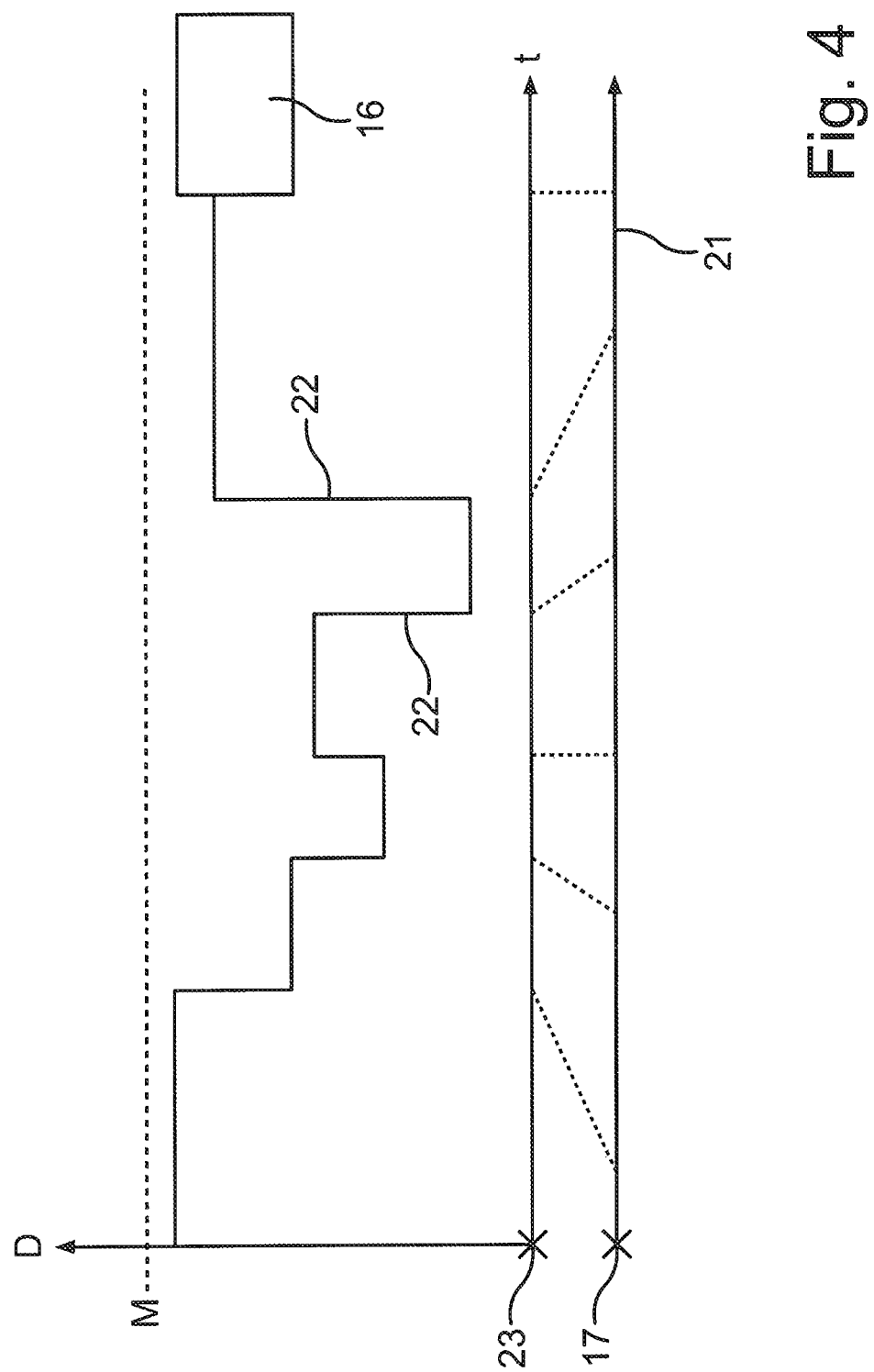
FIG. 4 shows a diagram illustrating a first embodiment of the method according to the invention.
Figure 5:
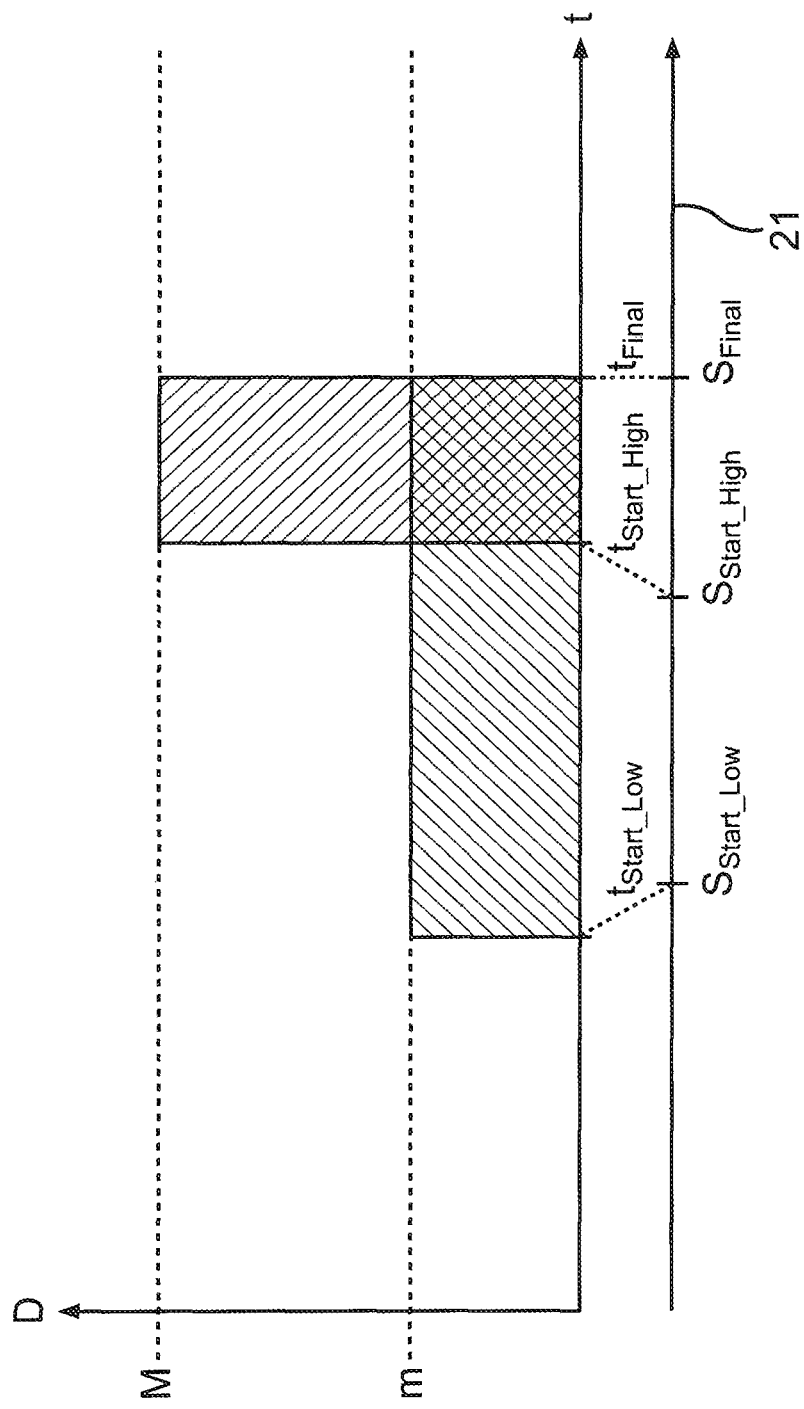
FIG. 5 shows a diagram for illustrating a transmission of route data for two different transmission bandwidths.
Figure 6:
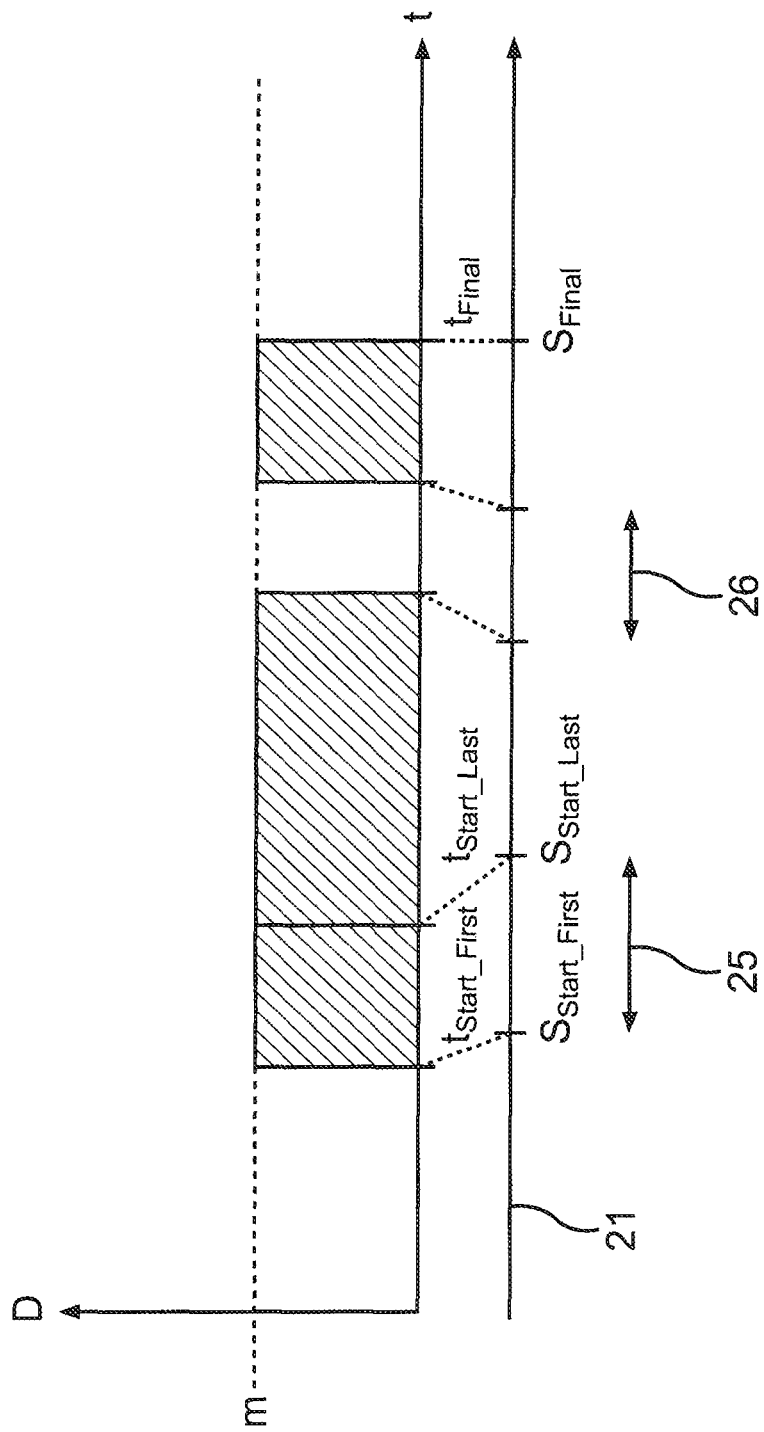
FIG. 6 shows a diagram for illustrating a transmission of route data, in which a dead spot is taken into account.
Figure 7:
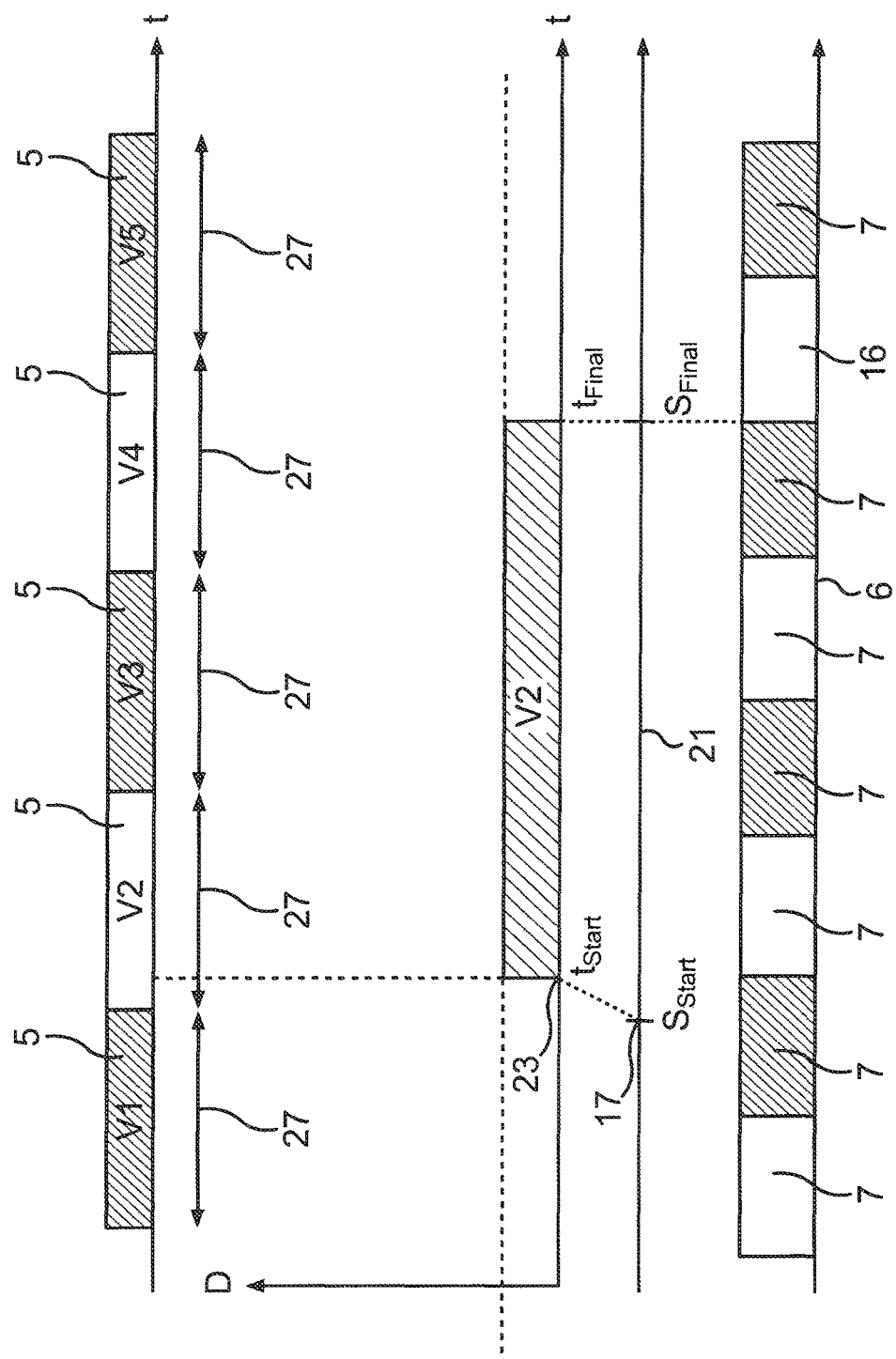
FIG. 7 is a diagram illustrating an embodiment of the method, in which version values are taken into account.
Figure 8:
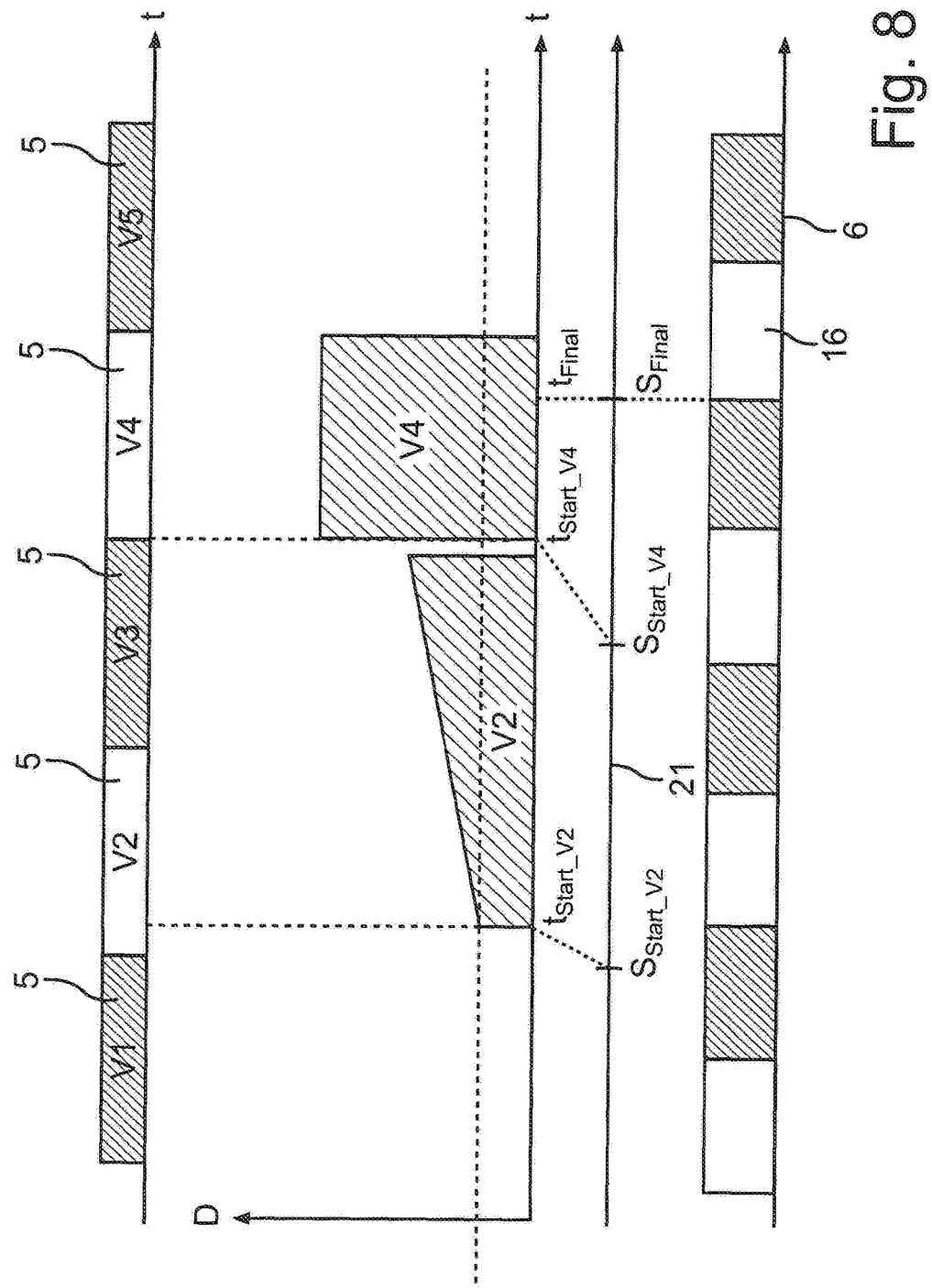
FIG. 8 is a diagram illustrating an embodiment of the method, in which a fast transmission is used to receive route data with a more updated version value.
Figure 9:
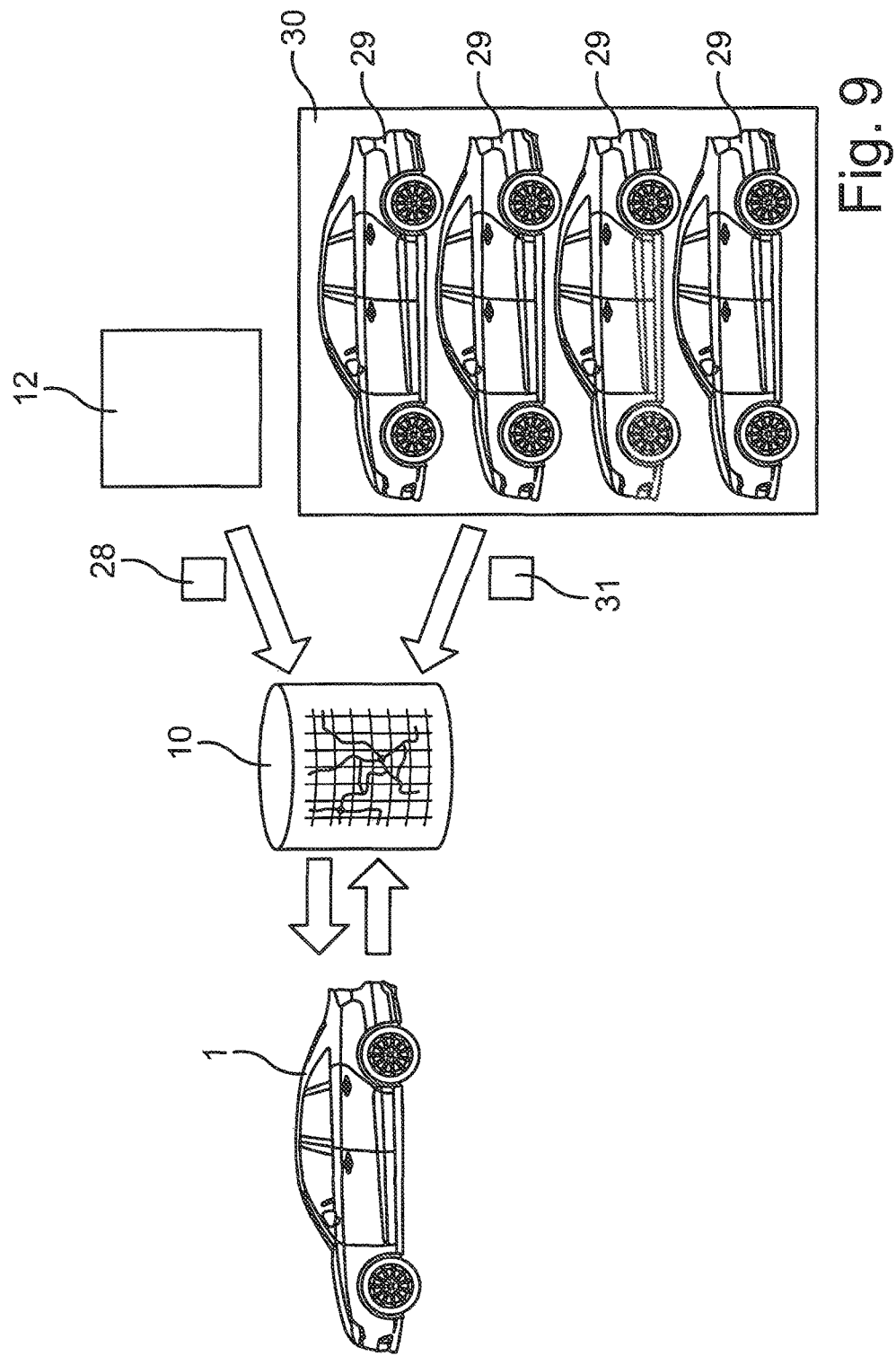
FIG. 9 shows a schematic representation of the server during creation of a digital map on the basis of measured values.

In the following, an exemplary embodiment of the invention is described. The following is shown:

FIG. 1 shows a schematic representation of an embodiment of the motor vehicle according to the invention;

FIG. 2 shows a sketch for a trip of the motor vehicle from FIG. 1 along a driving route;

FIG. 3 shows a digital map with measured values of an expected transmission bandwidth;

FIG. 4 shows a diagram illustrating a first embodiment of the method according to the invention;

FIG. 5 shows a diagram for illustrating a transmission of route data for two different transmission bandwidths;

FIG. 6 shows a diagram for illustrating a transmission of route data, in which a dead spot is taken into account;

FIG. 7 is a diagram illustrating an embodiment of the method, in which version values are taken into account;

FIG. 8 is a diagram illustrating an embodiment of the method, in which a fast transmission is used to receive route data with a more updated version value; and FIG. 9 shows a schematic representation of the server during creation of a digital map on the basis of measured values;

The exemplary embodiment described below is a preferred embodiment of the invention. In the exemplary embodiment, however, the described embodiment components each represent single features to be considered independently from each other, which the invention also further develops independently and which are also to be considered individually or in another of the described combinations as a component of the invention. Additionally, the described embodiment is also expandable by additional, already described features of the invention.

In the figures, elements which are functionally equivalent are each given the same reference numbers.

FIG. 1 shows a motor vehicle 1, which is, for example, a car, particularly a passenger car. As illustrated in FIG. 2, the motor vehicle 1 can be located on a trip from a starting location 2 to a destination 3. A device 4, which is, for example, a navigation device or a control unit for an ESP or an infotainment system, can be provided to support the motor vehicle 1 driver (not shown) during the trip. For the support, current route data 5 of a driving route 6 are required from the device 4. The driving route 6 leads from the starting location 2 to the destination 3. A driving route 6 may be known, for example, by means of a navigation device of the motor vehicle 1, which has determined the driving route 6 determined during route planning. The method can be applied in different systems (in the motor vehicle). An ESP control unit is only an example here.

The route data 5 may comprise the information necessary for providing the device function for individual areas or regions or areas or territories 7 along the driving route 6 by means of the device 4, that is, for example, road geometries or friction value data of road surfaces or weather data. The route data 5 for the regions 7 do not have to be completely stored in the motor vehicle 1; in other words, along the driving route 6, only the route data 5, for example, belonging the area 7 directly ahead of this area 7 are kept available.

For this purpose, the motor vehicle 1 has a control device 8 and a wireless device 9. The control device 8 may be provided, for example, by a control unit and/or a central computing device of the motor vehicle 1. The wireless device 9 may be, for example, a mobile wireless module, for example, a UMTS or LTE or GSM, or be provided by a WLAN wireless module. Using the control device 8, the respective route data 5 can be downloaded from a stationary server 10 by means of the wireless device 9 for an area 7. To this end, a wireless connection 11 can be established, for example to a mobile network 12, and a request 14 for the route data 5 of the area 7 ahead can be transmitted from the control device 8 to the server 10 by means of the wireless device 9 and, for example, the Internet 13. The server 10 may be provided, for example, by one or more computers. The control device 10 may be connected to the Internet 13, for example, via an Ethernet controller. The server 10 can receive the request 14 and transmit the requested route data 5 to the control device 8 via the communication link described by means of the wireless connection 11. The server 10 here transmits the most updated route data 5 when the request 14 is received.

In order for the most updated route data 5 to be provided by the control device 8 in the device 4, the route data 5 are requested as late as possible from the server 10.

However, the transmission of the route data 5 may require a download time, which can be, for example, in a range of one minute to 15 minutes. Therefore, the control device 8 requests the route data 5 with the request 14 in enough time before reaching the respective area 7. To ensure the control device 8 can schedule the requesting and downloading, the following method is provided.

For the explanation of the method, it is assumed in the following that the motor vehicle 1 is located at a current position 15 along the driving route 6 (see FIG. 2). The motor vehicle 1 requires the route data 5 for an area 16 up ahead of the areas 7, along the driving route 6. The control device 8 then determines a special trigger location 17. Once the motor vehicle 1 reaches the trigger location 17, the control device 8 can send the request 14 and start with downloading the route data 5. It is then highly likely that the downloading of route data 5 will be completed as soon as the motor vehicle 1 reaches the area 16, In order to determine the suitable trigger location 17, a digital map 18, which is represented in FIG. 3, may be stored in the control device 8. The map 18 can also have been downloaded from the server 10 by the control device 8. A measured value or parameter value indicating the available transmission bandwidth or maximum data rate for the wireless link 11 in the respective map area 19 may be specified at map areas 19 in the map 18. In FIG. 3, only some of the map areas 19 have reference numbers for the sake of clarity. FIG. 3 shows that only one value may be specified, for example, in the map areas 19; this value may be, for example, the lowest value for the data rate within the map area 19. By way of example, FIG. 3 shows only three different values, B1, B2, B3, illustrated by different hatch marks.

The control device 8 may furthermore determine a speed profile 20, which may indicate a respective expected average driving speed for different points along the driving route 6. The speed profile 20 may also be obtained from the server 10 on the basis of fleet data, i.e. have been determined on the basis of measurement values from other motor vehicles.

FIG. 4 shows how the control device determines, on the basis of values B1, B2, B3, the expected available transmission bandwidth or data rate D for the individual map areas 19 for a driving route section 21 between the current position 17 and the area 16. Starting from the area 16, the required loading time or transmission time can be determined in the reverse along the driving route section 21 by means of the available data rate D, by integrating the available data rate D over time t. According to the grid shown in FIG. 3, jumps 22 can occur in the available data rate D. FIG. 4 further shows the maximum available data rate M as may result with optimal transmission conditions. The described accumulation of the data rate D results in a start time 23 to begin the transmission of route data on the driving route section 21. On the basis of the speed profile 20, the trigger location 17 on the route section 21 can be determined from the start time 23.

With the motor vehicle 1, the conflict of objectives is resolved that it must be ensured through the caching strategy that the necessary data are available in the device on time and thus are as updated to the extent possible and, in doing so, also do not have to be repeatedly downloaded from the server and thus for nothing. The method described here resolves the conflict of objectives through the anticipatory downloading of the route data while considering the online availability along the driving route, i.e. the transmission bandwidth of the wireless link 11. Thus, the availability and quality of the online connection is considered for future positions on the basis of the driving route. The driving route results, for example, from the destination-guided route, a route predicted from the driving behavior or the most likely path through the so-called ADAS horizon, as was described at the beginning.

The type of wireless network available, whether the vehicle is going through a roaming area 24, and/or which availability and quality parameters for location and different times of day and/or days of the week and/or seasons are available are stored in the geo-referenced online availability map 18. The map can be transmitted or updated by the server to the motor vehicle 1 with the highest priority for a relevant driving area of the motor vehicle and the relevant traveling time in order to permanently provide a statement on the availability and quality of the wireless connection 11 by the control device 8.

The predictive download strategy described in FIG. 4 provides for using the online availability map 18 in the control device to determine whether and in what quality or at what transmission rate the route data can be downloaded at a predetermined location and time along the driving route.

The location and the corresponding time at which the data must be downloaded result starting from the given driving route, i.e. at the edge of the area 16 at the time $t_{Final}$ and accordingly at the route location $S_{Final}$.

Additionally, the latest start time $t_{Start}$ and/or trigger location $S_{Start}$ which the download must be started in order to arrive at the area 16 of the download will be completed depending on the data rate D available. When the data rate is faster, this results in a possible later start time than when the data rate is slower, as is shown by example in FIG. 5 for a maximum data rate M and a slower data rate m than the maximum data rate m.

To ensure successful download before the area 16 is reached, a safety buffer 25 may be provided, as is shown in FIG. 6. The safety buffer 26 exists in that the start time is additionally delayed. The safety buffer 25 can be formed, for example, from the value and the variance of the driven driving speed and the predicted data rate. For example, corresponding variance values can be provided in the speed profile 20. If reception is not possible for a route section, i.e. a dead spot 26 is present, the downloading must be delayed for this section through the dead spot 26 according to the transit time, i.e. the interruption of the transmission of the route data are taken into account.

In the predictive download strategy, as has been previously described, the currentness or possible change in the route data is disregarded. For route data with a very short update cycle, for example, warning messages or speed limits, the route data change once or multiple times during the trip of the motor vehicle 1; various versions are provided by the server during the trip.

In some cases, it is possible for the downloading of the route data to take longer than an update cycle 27 of the route data takes. This is shown in FIG. 7 for an example in which the route data 5 with version V2 is downloaded by the control device 8. When the area 16 is reached, version V4 of the route data 5 is already available; this version V4 was not available at the trigger location 17 at the start time 23. Because of this, the most updated route data are not available due to the limited transmission rate within the device 4. In order to ensure that the most updated route data possible is provided in the device, the version valid at the time of download $t_{START}$ is to be downloaded; this is version V2 in the example.

FIG. 8 shows an example in which, due to favorable transmission conditions during the transmission of the route data 5 with version V2, the data rate increases, so that the route data are transmitted completely before the area 16 has been reached. If there is still time remaining after successful downloading, the version of the route data then current on the server should be downloaded and used in order to completely carry out an update of the route data with the version current at that time. In the example, this is version V4. In doing so, the previous version must be maintained or stored in the control device until the update of the route data has been successfully completed in the control device.

In the context of the described predictive download strategy, the route data are preferably loaded according to a priority, wherein the priority can result according to at least one of the following priority criteria:

The relevant area, e.g. around the vehicle position, the corridor of the horizon, or the destination-guided route, or the destination periphery;

The functional data type, e.g. road data, road detail geometry, 3-D building models (in this order);

The update cycle, e.g. real-time data for real-time control of the device by the minute, e.g. a current traffic light cycle of a traffic light; dynamic data, for example reports of construction sites, in messages on an hourly basis; variable data, such as street sign positions, on a daily basis, and static data, e.g. road geometries, for example, on a weekly basis;

The age of the data, e.g. depending on the update cycle;

The aforementioned examples of priority criteria indicate a possible order of the priority, wherein the highest priority is always mentioned first in the described lists.

The update of the online availability map 18 can also be carried out cyclically by the server and provided in the control device 8 by downloading. This map 18 can be continuously updated on the server for the entire relevant map area. To this end, mobile wireless statistics from the network carrier can be used. In other words, control values 28 can be transmitted from the mobile wireless network 12 to the server 10. Through the control values, current settings of at least one communication route parameter, wireless link parameter here, are described, through which the transmission bandwidth of the wireless link is determined. Additionally or alternatively, reception statistics can be used by several other vehicles 29 in a vehicle fleet 30. In other words, measurement values 31 and the vehicle fleet 30 can be transmitted to the server 10. The measured values 31 can describe, for example, the reception quality or a signal-to-noise ratio or a transmission bandwidth measured by a respective motor vehicle 29. The respective location of the motor vehicle 29 can likewise be determined here, for example by means of a GPS sensor. Thus, each motor vehicle 29 constantly determines the availability and quality of online connections with a location and time reference and transmits this information cyclically to the server 10 as measured values 31. The received data 28 and/or 31 regarding the online availability map 18 are collected on the server 10 and provided back to all vehicle, in particular the motor vehicle 1.

By considering the online availability map, the download strategy can be adapted such that the absence of downloaded data due to an impaired or limited online connection can be avoided or reduced. Thus, the data update for navigation and driver assistance systems (DAS) in the vehicle can be ensured and this results in the following advantages:

Better availability of online and hybrid navigation (guidance) for the driver, better availability of online and hybrid navigation using predictive route data/ADAS for driver assistance systems, minimizing download costs for the driver or for the vehicle manufacturer in the case of a so-called embedded mobile wireless station, which is operated in the motor vehicle 1 at the expense of the vehicle manufacturer 1. Furthermore, minimization of roaming costs results for the driver and the company. An optimum utilization of the available hardware is deemed present, because a reduction of the memory requirements for the hybrid navigation results in the motor vehicle 1.

Overall, the example shows how an optimization of the anticipatory download can be provided by the invention through online availability maps.

The invention claimed is:

1. A method for transmitting route data to a mobile terminal device, wherein the route data describe an area lying ahead along a current travel route of the mobile terminal device, the method comprising:
   determining a route section of the current travel route extending between a current position of the mobile terminal device and the area;
   determining an expected transmission bandwidth along the route section for transmission of the route data to the mobile terminal device;
   determining an expected speed profile of a moving speed of the mobile terminal device along the route section;
   determining a start time, at which the transmission must be started, so that the route data are completely transmitted when the area is reached according to the expected speed profile and according to the expected transmission bandwidth;
   determining a trigger location, which corresponds to the start time according to the expected speed profile; and
   waiting until the trigger location is reached to request the route data from a stationary server via a communication link;
   wherein the expected transmission bandwidth is determined based on measurement data from other vehicles or terminal devices, which have traveled the route section before the mobile terminal device, and
   wherein the route data are received as a data package with a version value and, after completion of the transmission, a data package having a subsequent version value is requested based on the mobile terminal device being still outside the area.

2. The method according to claim 1, wherein determining the expected transmission bandwidth further comprises:
   receiving a digital map in which location-dependent measured values and/or provider-specific control values are specified by at least one communication link parameter of the communication link, wherein the location-dependent measured values and/or provider-specific control values indicate the expected transmission bandwidth from the stationary server via the communication link.

3. The method according to claim 1, wherein a variance of the moving speed is indicated by the speed profile at at least one location along the route section, and a time buffer is provided, through which the start time is shifted forward in time, as a function of the variance when determining the start time.

4. The method according to claim 1, wherein, when determining the start time, a transmission pause is scheduled during the determination of the start time, based on an estimated transmission bandwidth in a part of the route section violating a predetermined quality criterion and/or cost criterion.

5. The method according to claim 1, wherein the route data comprise incremental updates that is incrementally combined with the route data.

6. The method according claim 1, wherein the route data are requested and/or transmitted in a sequence predetermined by means of a prioritization criterion.

7. The method according to claim 1, wherein the route data contain navigation data and/or weather data for the area.

8. A motor vehicle comprising:
a communication device configured to communicate with a stationary server during a trip of the motor vehicle;
a device configured to provide a vehicle function based on route data, which describe an area lying ahead of a current travel route of the trip; and
a control device configured to provide the route data from the stationary server, using the communication device, to the device configured to provide the vehicle function by:
determining a route section of the current travel route extending between a current position of the motor vehicle and the area;
determining an expected transmission bandwidth along the route section for transmission of the route data to the motor vehicle;
determining an expected speed profile of a moving speed of the motor vehicle along the route section;
determining a start time, at which the transmission must be started, so that the route data are completely transmitted when the area is reached according to the expected speed profile and according to the expected transmission bandwidth;
determining a trigger location, which corresponds to the start time according to the expected speed profile; and
waiting until the trigger location is reached to request the route data from the stationary server via a communication link;
wherein the expected transmission bandwidth is determined based on measurement data from other vehicles or terminal devices, which have traveled the route section before the motor vehicle, and
wherein the route data are received as a data package with a version value and, after completion of the transmission, a data package having a subsequent version value is requested based on the motor vehicle being still outside the area.

9. The motor vehicle according to claim 8, wherein a variance of the moving speed is indicated by the speed profile at at least one location along the route section, and a time buffer is provided, through which the start time is shifted forward in time, as a function of the variance when determining the start time.

10. The motor vehicle according to claim 8, wherein, when determining the start time, a transmission pause is scheduled during the determination of the start time, based on an estimated transmission bandwidth in a part of the route section violating a predetermined quality criterion and/or cost criterion.

11. The motor vehicle according to claim 8, wherein the route data comprise incremental updates that are incrementally combined with the route data.

12. The motor vehicle according to claim 8, wherein the route data are requested and/or transmitted in a sequence predetermined by means of a prioritization criterion.

13. The motor vehicle according to claim 8, wherein the route data contain navigation data and/or weather data for the area.

* * * * *